United States Patent
Zhu et al.

(10) Patent No.: US 10,287,653 B2
(45) Date of Patent: May 14, 2019

(54) BRASS ALLOYS FOR USE IN TURBOCHARGER BEARING APPLICATIONS

(71) Applicant: HONEYWELL INTERNATIONAL INC., Morristown, NJ (US)

(72) Inventors: Shouxing Zhu, Shanghai (CN); Bin Shen, Shanghai (CN); Marc Wilson, Thaon-les-Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 547 days.

(21) Appl. No.: 13/838,736

(22) Filed: Mar. 15, 2013

(65) Prior Publication Data
US 2014/0259674 A1 Sep. 18, 2014

(51) Int. Cl.
C22C 9/04 (2006.01)
C22F 1/08 (2006.01)

(52) U.S. Cl.
CPC .................. *C22C 9/04* (2013.01); *C22F 1/08* (2013.01); *Y10T 29/49709* (2015.01)

(58) Field of Classification Search
CPC ..................................... C22F 1/08; C22C 9/04
USPC .......................................................... 420/477
See application file for complete search history.

(56) References Cited

U.S. PATENT DOCUMENTS

| | | |
|---|---|---|
| 4,055,445 A | 10/1977 | Pops |
| 4,110,132 A | 8/1978 | Parikh et al. |
| 4,113,475 A | 9/1978 | Smith |
| 5,658,401 A | 8/1997 | Gaag et al. |
| 6,132,528 A | 10/2000 | Brauer et al. |
| 6,458,222 B1 | 10/2002 | Matsubara et al. |
| 6,942,742 B2 | 9/2005 | Yamagishi |
| 2001/0001400 A1 | 5/2001 | Brauer et al. |

(Continued)

FOREIGN PATENT DOCUMENTS

| | | |
|---|---|---|
| CN | 102851533 A | 1/2013 |
| CN | 102925743 A | 2/2013 |

(Continued)

OTHER PUBLICATIONS

Thomson, J. : Development of a Lead-Free Bearing Material for Aerospace Applications, International Journal of Metalcasting Winter 2010, American Foundry Society, 2010; http://surajaconsulting.ca/wp-content/uploads/2010/07/20090185A.pdf.

(Continued)

*Primary Examiner* — Weiping Zhu
(74) *Attorney, Agent, or Firm* — Lorenz & Kopf, LLP

(57) ABSTRACT

In accordance with an exemplary embodiment, a high-strength brass alloy includes, by mass %, about 1.3% to about 2.3% of aluminum (Al), about 1.5% to about 3.0% of manganese (Mn), about 1% maximum of iron (Fe), about 1% maximum of nickel (Ni), about 0.4% maximum of tin (Sn), about 0.5% to about 2.0% of silicon (Si), about 57% to about 60% of copper (Cu), less than about 0.1% of lead (Pb), and the balance of zinc (Zn) and inevitable impurities, with the proviso that the ratio of Si/Mn is in the range of about 0.3 to about 0.7, and with the further proviso that the "zinc equivalent" content according to the following formula: ZnEq=Zn+Si*10−Mn/2+Al*5 is from about 51% to about 58%.

6 Claims, 1 Drawing Sheet

(56) References Cited

U.S. PATENT DOCUMENTS

| | | | |
|---|---|---|---|
| 2007/0062615 A1* | 3/2007 | Oishi | C22F 1/08 148/434 |
| 2007/0158002 A1 | 7/2007 | Oishi | |
| 2008/0202653 A1 | 8/2008 | Ignberg | |
| 2008/0240973 A1 | 10/2008 | Gaag et al. | |
| 2008/0253924 A1 | 10/2008 | Oishi | |
| 2009/0263272 A1 | 10/2009 | Uchida | |
| 2011/0129173 A1 | 6/2011 | Yokota et al. | |
| 2012/0020600 A1 | 1/2012 | Nishimura et al. | |
| 2012/0207642 A1 | 8/2012 | Zeiger et al. | |
| 2012/0251382 A1 | 10/2012 | Peng et al. | |
| 2012/0251383 A1 | 10/2012 | Toda et al. | |

FOREIGN PATENT DOCUMENTS

| | | | |
|---|---|---|---|
| DE | 102009021336 A1 | 11/2010 | |
| EP | 0947592 A1 | 10/1999 | |
| EP | 1712648 A2 * | 10/2006 | C22C 9/04 |
| JP | 2002003967 A | 1/2002 | |
| WO | 2004046404 A1 | 6/2004 | |
| WO | 2009047919 A1 | 4/2009 | |
| WO | 2012104426 A2 | 8/2012 | |

OTHER PUBLICATIONS

PCT International Search Report, Notification Date Jul. 10, 2014; Application No. PCT/US2014/027538.

PCT International Preliminary Report on Patentability for International Application No. PCT/US2014/027538 dated Sep. 24, 2015.

EP Communication for Application No. 14770702.0-1362/2971819 PCT/US2014027538 dated Mar. 8, 2016.

Deutsches Kupferinstitut; Data Sheet for Copper Alloy No. CW713R (CuZn37Mn3Al2PbSi), 2005.

Extended EP Search Report for Application No. 14770702.0-1362/2971819 PCT/US2014027538.

EP Examination Report for Application No. 14770702.0 dated Feb. 20, 2018.

* cited by examiner

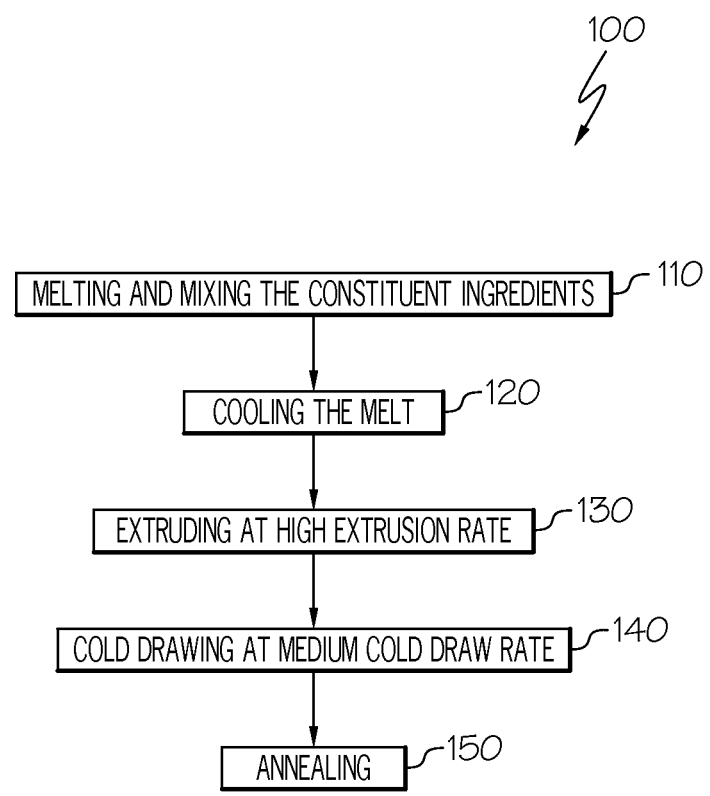

BRASS ALLOYS FOR USE IN TURBOCHARGER BEARING APPLICATIONS

TECHNICAL FIELD

The present disclosure generally relates to gas turbine engines such as turbochargers. More particularly, the present disclosure relates to lead-free brass alloys for use in manufacturing components, such as bearings, for use in turbochargers.

BACKGROUND

A gas turbine engine, such as a turbocharger, may be used to power aircraft, automobiles, or various other types of vehicles and systems. Turbochargers known in the art may employ high strength brass alloys for some of the components thereof. As is known in the art, a high-strength brass alloy has a matrix that may exhibit various phases such as an α phase, β phase, α+β phase, and γ phase, according to the total amount of added elements that are weighed by zinc equivalent. If the amount corresponding to the zinc equivalent is small, the matrix exhibits the α phase. A high-strength brass alloy exhibiting the α phase has superior toughness but has low hardness. If the amount corresponding to the zinc equivalent is increased, the matrix exhibits the β phase. Moreover, if the amount corresponding to the zinc equivalent is further increased, the matrix exhibits the γ phase. In a high-strength brass alloy exhibiting the γ phase, hardness is increased and wear resistance is improved, whereas toughness is greatly decreased and shock resistance is decreased.

Turbochargers current known in the art employ such alloys to manufacture the bearing components of the turbochargers. However, these alloys undesirably include a percentage of lead. Exemplary allows known in the art for such applications include CW713R available from Seeberger GmbH & Co. KG of Schalksmühle, Germany and C67400 available from National Bronze and Metals, Inc. of Houston, Tex. Due to their lead content, these prior art alloys cannot meet the Europe ELV directives requirement of lead below 0.1% by January, 2015.

Currently, the alloy C90300 tin bronze, also available from National Bronze and Metals, Inc., is a lead-free alloy that is available for use in turbochargers for commercial vehicles. However, passenger vehicles have more stringent requirements than commercial vehicles in terms of wear-resistance and thermo-physical properties. As such, C90300 is not available for use in passenger vehicle components due to these more stringent requirements, including good machinability, wear resistance, and certain mechanical properties and thermo-physical properties. Thus, the prior art remains deficient.

Accordingly, it is desirable to provide improved alloys for use in manufacturing components for use in gas turbine engines. Further, it is desirable to provide such alloys that are lead-free. Still further, it is desirable to provide alloys suitable for use in passenger vehicle application. These and other desirable features and characteristics of the disclosure will become apparent from the subsequent detailed description and the appended claims, taken in conjunction with the accompanying drawings and this background of the disclosure.

BRIEF SUMMARY

In accordance with an exemplary embodiment, a high-strength brass alloy includes, by mass %, about 1.3% to about 2.3% of aluminum (Al), about 1.5% to about 3.0% of manganese (Mn), about 1% maximum of iron (Fe), about 1% maximum of nickel (Ni), about 0.4% maximum of tin (Sn), about 0.5% to about 2.0% of silicon (Si), about 57% to about 60% of copper (Cu), less than about 0.1% of lead (Pb), and the balance of zinc (Zn) and inevitable impurities, with the proviso that the ratio of Si/Mn is in the range of about 0.3 to about 0.7, and with the further proviso that the "zinc equivalent" content according to the following formula: ZnEq=Zn+Si*10−Mn/2+Al*5 is from about 51% to about 58%.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

Exemplary embodiments will hereinafter be described in conjunction with the following drawing FIGURE, wherein like numerals denote like elements, and wherein:

FIG. 1 is a flowchart illustrating a method in accordance with one embodiment of the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the gas turbine engine components and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The brass alloy for gas turbine engine applications, such as turbocharger bearing applications, of the present disclosure is achieved by the inventors' surprising and unexpected findings in view of the prior art. Embodiments of the present disclosure provide a high-strength brass alloy that includes, by mass %, about 1.3% to about 2.3% of aluminum (Al), about 1.5% to about 3.0% of manganese (Mn), about 1% maximum of iron (Fe), about 1% maximum of nickel (Ni), about 0.4% maximum of tin (Sn), about 0.5% to about 2.0% of silicon (Si), about 57% to about 60% of copper (Cu), less than about 0.1% of lead (Pb), and the balance of zinc (Zn) and inevitable impurities, with the proviso that the ratio of Si/Mn is in the range of about 0.3 to about 0.7, and with the further proviso that the "zinc equivalent" content according to the following formula: ZnEq=Zn+Si*10−Mn/2+Al*5 is from about 51% to about 58%. The high-strength brass alloy thus has a structure that includes a matrix of β phase, with the α and MnSi phase, γ phases minimized. The disclosed alloy includes the β phase in an amount greater than about 75%, for example greater than about 90%. Further, the γ phase is present in an amount that is less than about 0.5% to improve machinability.

Hereinafter, the element compositions of the high-strength brass alloy of the present disclosure are described. Zn improves strength of the matrix, wear resistance, shock resistance, and corrosion resistance to lubricant, and also Zn affects the structure of the matrix. According to the amount of Zn, phases such as the α phase, β phase, and γ phase are generated in the structure of the matrix. The necessary amount of Zn depends on the zinc equivalents of the other elements and the amounts thereof. When the amount of Zn is less than 17 mass %, the α phase is generated in the structure of the matrix, whereby wear resistance is decreased. On the other hand, when the amount of Zn is more than 40 mass %, the γ phase is generated in the structure of the matrix, whereby the alloy is embrittled. Therefore, the amount of Zn is set to be from about 35% to about 40 mass %.

Al facilitates generation of the β phase and is effective for strengthening the matrix. On the other hand, Al has large zinc equivalent and facilitates generation of the γ phase, which is similar to the case of Si. When the amount of Al is less than 1.3 mass %, sufficient hardness required for wear resistance is not obtained. On the other hand, when the amount of Al is more than 2.3 mass %, the γ phase is generated and thereby the alloy is embrittled. Therefore, the amount of Al is set to be from about 1.3% to about 2.3 mass %.

Mn primarily combines with Si, which will be described later, and Mn precipitates $Mn_5Si_3$ intermetallic compounds. Therefore, Mn improves wear resistance and decreases the solid solution of single Si into the matrix to approximately the zero level by combining with Si. When the amount of Mn is less than about 1.5 mass %, the above effects are not sufficiently obtained. On the other hand, when the amount of Mn is greater than 3.0 mass %, the above effects are not greatly increased. Therefore, the amount of Mn is set to be about 1.5% to about 3.0 mass %.

Fe combines with Mn and Si and precipitates Fe—Mn—Si intermetallic compounds, thereby improving wear resistance. When the amount of Fe is more than 1 mass %, the above effect is not greatly increased. Therefore, the amount of Fe is set to be a maximum of about 1 mass %.

Ni is solid-solved into the matrix and improves the strength and the toughness of the alloy. Moreover, Ni combines with Si and Zn and forms fine intermetallic compounds of Ni system dispersed in the matrix, thereby improving wear resistance. Since Ni has negative zinc equivalent, the amount of Ni is not more than 1 mass % so as to obtain a single phase structure of the β phase. Therefore, the amount of Ni is set to be a maximum of about 1 mass %.

Si combines with Fe and Mn and precipitates Fe—Mn—Si intermetallic compounds, thereby improving wear resistance. Moreover, by decreasing the solid solution of Si into the matrix to approximately the zero level by Mn and Fe that are added at the same time, generation of the γ phase in the matrix is prevented. In order to obtain a necessary amount of the Fe—Mn—Si intermetallic compounds, the amount of Si is not less than 0.5 mass %. On the other hand, when the amount of Si is more than 2 mass %, the amount of solid solution of Si into the matrix is increased, and the γ phase is generated. Therefore, the amount of Si is set to be 0.5 to 2.0 mass %. Preferably, the amount of silicon exceeds about 1.3%. Even more preferably, the amount of silicon exceeds about 1.5%.

Sn increases the strength of the alloys of the disclosure and also increases the resistance of the alloys to stress relaxation. However, tin makes the alloys more difficult to process, particularly during hot processing. When the tin content exceeds 0.4%, the cost of processing the alloy may be prohibitive for certain commercial applications. Thus, tin is included in the present alloy in a maximum amount of about 0.4% mass.

In the prior art, lead is added to brass alloys to facilitate the machining of the alloy. However, the lead content in brass is desired to be reduced due to the harm caused by lead against the environment and against human health upon mixing with water. Further, new laws, such as the Europe ELV directives, require lead to be below a prescribed amount. Thus, lead is present in the present alloy in an amount that is less than about 0.1% mass.

To maintain machinability in view of the diminished lead content, the alloy includes γ phase in an amount that is less than about 0.5%. The disclosed alloy includes the β phase in an amount greater than about 75%, for example greater than about 90%. The above-noted phase requirements are achieved by the following provisos: the ratio of Si/Mn is in the range of about 0.3 to about 0.7, and the "zinc equivalent" content according to the following formula: $ZnEq=Zn+Si*10-Mn/2+Al*5$ is from about 51% to about 58%. As such, a relatively high zinc equivalent results in an alloy that is primarily beta phase, with the alpha phase minimized. Further, by maintaining the zinc equivalent below about 58%, the amount of gamma phase is minimized below about 0.5%.

The alloys of the present disclosure are fabricated according to the following method 100, illustrated in FIG. 1. First, the alloys are prepared by melting and mixing the constituent ingredients (step 110). The melt is then cooled (step 120). Thereafter, thermal processing is implemented. Thermal processing includes a relatively high extrusion rate (step 130) of equivalent to and above about 96% followed by a medium cold draw rate (step 140) of about 5% to about 8%. Thermal processing with the above-noted relatively high extrusion rate and medium/average cold draw rate has been found to beneficially strengthen the alloy material. An annealing process (step 150) may hereafter further be employed in order to maintain a stable microstructure, and further to obtain a sufficient toughness, for example for use in temperature ranges of about 290 to about 480° C.

The foregoing method 100 is particularly suitable for alloys of the present disclosure having beta phase in the range of about 75% to about 90%, by weight. In particular, in order to provide sufficient toughness and machinability to the alloy, it is suggested to apply the particular steps 110-150 for alloys having beta phase in the range of about 75% to about 90%. Of course, it is possible to apply to above method steps to alloys having other beta phase compositions as well.

High strength brass alloys prepared with the above-described composition and according to the above-described procedure desirable exhibit the technical requirements of bearing materials for use in turbocharger applications. These requirements include: Tensile Strength Rm: 600 MPa minimum; Proof Strength Rp 0.2: 350 MPa minimum; Elongation Ratio: 12% minimum.

ILLUSTRATIVE EXAMPLES

The present disclosure is now illustrated by the following non-limiting examples. It should be noted that various changes and modifications can be applied to the following example and processes without departing from the scope of this invention, which is defined in the appended claims.

Therefore, it should be noted that the following example should be interpreted as illustrative only and not limiting in any sense.

The following alloys in Table 1 were prepared in accordance with the present disclosure:

TABLE 1

| | Cu | Pb | Fe | Sn | Ni | Mn | Si | P | Bi | Al | Zn | Si/Mn | Zinc EQ |
|---|---|---|---|---|---|---|---|---|---|---|---|---|---|
| Ranges | 57~60 | <0.1 | 1 (Max) | 0.4 (Max) | 1 max | 1.5~3.0 | 0.5~2.0 | <0.01 | <0.01 | 1.3~2.3 | balance | 0.3-0.7 | 51-58 |
| Example 1 | 58.5 | 0.01 | 0.36 | 0.2 | 0.01 | 2.26 | 0.83 | 0.008 | 0.01 | 1.66 | 37.82 | 0.367 | 53.29 |
| Example 2 | 59.3 | 0.031 | 0.24 | 0.2 | 0.01 | 1.85 | 1.12 | 0.001 | 0.001 | 1.6 | 37.25 | 0.605 | 55.52 |
| Example 3 | 58.1 | 0.02 | 0.15 | 0.24 | 0.01 | 1.08 | 0.96 | 0.008 | 0.01 | 1.62 | 39.43 | 0.889 | 56.59 |
| Example 4 | 59.7 | 0.01 | 0.25 | 0.25 | 0.24 | 1.35 | 0.91 | 0.008 | 0.01 | 1.5 | 37.28 | 0.674 | 53.21 |
| Example 5 | 59 | 0.23 | 0.23 | 0.17 | 0.05 | 2.9 | 1.63 | 0.004 | 0.01 | 1.38 | 35.79 | 0.562 | 57.54 |
| Example 6 | 59 | 0.01 | 0.35 | 0.26 | 0.08 | 2.41 | 1.17 | 0.006 | 0.01 | 1.41 | 36.71 | 0.485 | 54.26 |
| Example 7 | 58.2 | 0.01 | 0.13 | 0.04 | 0.01 | 1.81 | 0.96 | 0.008 | 0.01 | 1.81 | 38.83 | 0.530 | 56.58 |

The first four example alloys, above, were tested for phase constituency and machinability, as shown in Table 2:

TABLE 2

| | Phase constituent | Zinc equivalent | Machinability | Machinability |
|---|---|---|---|---|
| Example 1 | 77% Beta + 17alpha + 6% MnSi | 53.292 | No | Poor |
| Example 1 | 77% Beta + 17alpha + 6% MnSi | 53.292 | Yes | Good |
| Example 2 | 94.3% Beta + 1.7% alpha + 4% MnSi | 55.523 | No | Good |
| Example 3 | 96% Beta + 3% MnSi + alpha | 56.592 | No | Good |
| Example 4 | 79% Beta + 18% alpha + 2% MnSi | 53.207 | Yes | Good |

The example alloys were further tested for physical properties, as shown in Table 3:

TABLE 3

| Alloy | Tensile Strength (Mpa) | Yield Strength (Mpa) | Elongation (%) | Tensile/yield ratio | Impact Toughness J/cm2 | Hardness HB |
|---|---|---|---|---|---|---|
| Example 1 | 663 | 355 | 20 | 1.9 | 20 | 194 |
| Example 2 | 760 | 572 | 18 | 1.3 | 14 | 207 |
| Example 3 | 721 | 429 | 16 | 1.7 | 16 | 198 |
| Example 4 | 697 | | 18 | | | 193 |
| Example 6 | 658 | 435 | 19 | 1.5 | | 187 |
| Example 5 | 674 | 406 | 17 | 1.7 | 10 | 205 |

Example 1 was processed in accordance with the procedures set forth above. First, a 200 mm billet was extruded at a high extrusion rate to achieve a 99.4% reduction to about 15.4 mm. The extruded alloy was then cold drawn to achieve a 5.4% reduction to about 15.0 mm. The drawn alloy was then annealed at 300° C. It has been found by the inventors that alloys according to the present disclosure having a beta phase constituency in the range of about 75% to about 90% benefit by the above described high rate extrusion/medium rate cold drawing/anneal procedure to achieve a good machinability. Whereas, alloys according to the present disclosure having a beta phase constituency greater than about 90% do not require the above-noted procedure to achieve good machinability, and can be thermally treated according to known prior art procedures.

The alloy set forth herein can be used to manufacture, for example, a bearing for a turbocharger or other gas turbine engine. The bearing is manufactured therefrom by machining the shape of a bearing from a block of the alloy. As such, disclosed is an alloy for use as a turbocharger bearing, having, by weight: about 57% to about 60% copper; less 0.1% lead; less than about 1% iron; less than about 0.4% tin; less than about 1% nickel; about 1.5% to about 3.0% manganese; about 0.5% to about 2.0% silicon; about 1.3% to about 2.3% aluminum; and a balance zinc. Also, it should be noted that phosphorous and bismuth may each be present in an amount that is less than about 0.01%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. An alloy comprising, by weight:
about 57% to about 60% copper;
less than about 0.1% lead;
less than about 1% iron;
less than about 0.4% tin;
less than about 1% nickel;
about 1.5% to about 3.0% manganese;
about 0.5% to about 2.0% silicon;
about 1.3% to about 2.3% aluminum; and
a balance zinc,
with the proviso that a ratio of Si/Mn is in the range of about 0.3 to about 0.7, and with the further proviso that a zinc equivalent content according to the following formula: ZnEq=Zn +Si*10−Mn/2+Al*5 is from about 51% to about 58%, and with the further proviso that the alloy comprises beta phase in an amount from about 75% to about 90% by weight,
wherein the alloy has been thermally processed by extrusion at a rate of about 96% or greater followed by cold drawing at a rate of about 5% to about 8%, and wherein the alloy exhibits a tensile strength Rm greater than about 600 MPa, a proof strength Rp0.2 greater than about 350 MPa, and an elongation ratio greater than about 12% as a result of said thermal processing.

2. The alloy of claim 1, comprising gamma phase in an amount less than about 0.5% by weight.

3. A turbocharger bearing formed of an alloy that comprises, by weight:
about 57% to about 60% copper;
less than about 0.1% lead;
less than about 1% iron;
less than about 0.4% tin;
less than about 1% nickel;
about 1.5% to about 3.0% manganese;
about 0.5% to about 2.0% silicon;
about 1.3% to about 2.3% aluminum; and
a balance zinc,
with the proviso that a ratio of Si/Mn is in the range of about 0.3 to about 0.7, and with the further proviso that a zinc equivalent content according to the following formula: $ZnEq=Zn+Si*10-Mn/2+Al*5$ is from about 51% to about 58%, and with the further proviso that the alloy comprises beta phase in an amount from about 75% to about 90% by weight, and wherein the turbocharger bearing has been thermally processed by extrusion at a rate of about 96% or greater followed by cold drawing at a rate of about 5% to about 8% and thereby exhibits a tensile strength Rm greater than about 600 MPa, a proof strength Rp0.2 greater than about 350MPa, and an elongation ratio greater than about 12%.

4. The turbocharger bearing of claim 3, comprising gamma phase in an amount less than about 0.5% by weight.

5. A method of manufacturing a bearing for use in a gas turbine engine, the method comprising the steps of:
forming an alloy comprising by weight:
about 57% to about 60% copper;
less than 0.1%;
less than about 1% iron;
less than about 0.4% tin;
less than about 1% nickel;
about 1.5% to about 3.0% manganese;
about 0.5% to about 2.0% silicon;
about 1.3% to about 2.3% aluminum; and
a balance zinc,
with the proviso that a ratio of Si/Mn is in the range of about 0.3 to about 0.7, and with the further proviso that a zinc equivalent content according to the following formula: $ZnEq=Zn+Si*10-Mn/2+Al*5$ is from about 51% to about 58%, and with the further proviso that the alloy comprises beta phase in an amount from about 75% to about 90% by weight,
wherein forming the alloy comprises thermal processing by extrusion at a rate of about 96% or greater followed by cold drawing at a rate of about 5% to about 8%, such that the alloy exhibits a tensile strength Rm greater than about 600 MPa, a proof strength Rp0.2 greater than about 350 MPa, and an elongation ratio greater than about 12%; and
machining the alloy into the shape of a turbocharger bearing.

6. The method of claim 5, wherein the alloy comprises gamma phase in an amount less than about 0.5% by weight.

* * * * *